(12) United States Patent
Stoddard et al.

(10) Patent No.: US 11,524,762 B2
(45) Date of Patent: Dec. 13, 2022

(54) FUSELAGE STRUCTURE SPLICE

(71) Applicant: The Boeing Company, Chicago, IL (US)

(72) Inventors: Zachary Nathaniel Stoddard, Mukilteo, WA (US); Ronald Leroy McGhee, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 112 days.

(21) Appl. No.: 16/798,187

(22) Filed: Feb. 21, 2020

(65) Prior Publication Data

US 2021/0261230 A1  Aug. 26, 2021

(51) Int. Cl.
*B64C 1/06* (2006.01)
*B64F 5/10* (2017.01)

(52) U.S. Cl.
CPC .............. *B64C 1/069* (2013.01); *B64C 1/064* (2013.01); *B64F 5/10* (2017.01); *Y10T 428/197* (2015.01)

(58) Field of Classification Search
None
See application file for complete search history.

(56) References Cited

U.S. PATENT DOCUMENTS

| 6,644,081 | B1 | 11/2003 | Berry |
| 8,960,606 | B2 | 2/2015 | Diep et al. |
| 2008/0067289 | A1* | 3/2008 | Meyer ................... B64C 1/064 244/131 |
| 2010/0320321 | A1 | 12/2010 | Sauermann |
| 2010/0320322 | A1 | 12/2010 | Reye et al. |
| 2014/0117157 | A1 | 5/2014 | Diep et al. |
| 2014/0186588 | A1 | 7/2014 | Victorazzo |
| 2019/0039711 | A1 | 2/2019 | Diep et al. |

OTHER PUBLICATIONS

European Patent Office, Extended European Search Report regarding European Patent Application No. 21152547.2, dated Jun. 29, 2021, 9 pages.
U.S. Patent and Trademark Office, Non-Final Office Action regarding U.S. Appl. No. 16/798,220, dated Oct. 4, 2021, 14 pages.
U.S. Patent and Trademark Office, Non-Final Office Action regarding U.S. Appl. No. 16/798,220, dated Feb. 16, 2022, 9 pages.

* cited by examiner

*Primary Examiner* — Alexander S Thomas
(74) *Attorney, Agent, or Firm* — Kolisch Hartwell, P.C.

(57) ABSTRACT

A fuselage structure splice may include a panel having an edge and a strap connected to the first panel along the panel edge. A strap surface not in contact with the panel tapers toward the panel with distance from the panel edge. A stringer is mounted on the panel and extends away from the edge of the panel and has a flange mounted to the panel. A fitting has a stringer base portion and a strap base portion. The stringer base portion is connected to the stringer flange and extends along a first line extending in a plane normal to the panel edge. The strap base portion of the fitting is mounted on the strap surface and extends along a second line in the plane. The second line is transverse to the first line and the strap base portion of the fitting has a constant thickness along the second line.

20 Claims, 11 Drawing Sheets

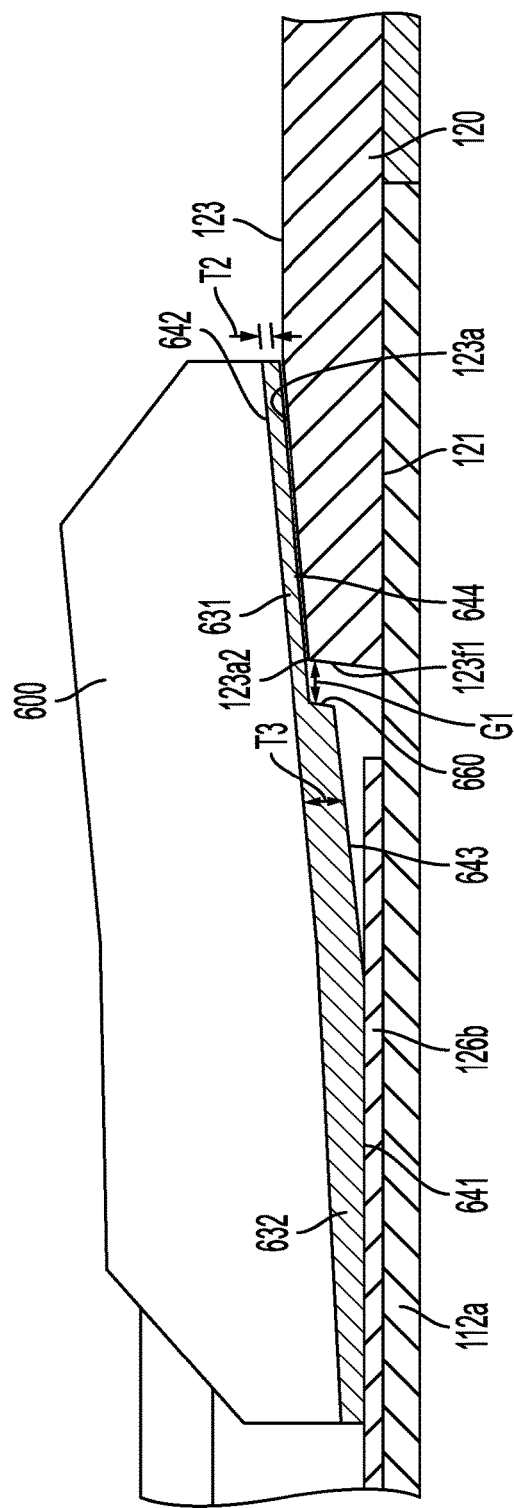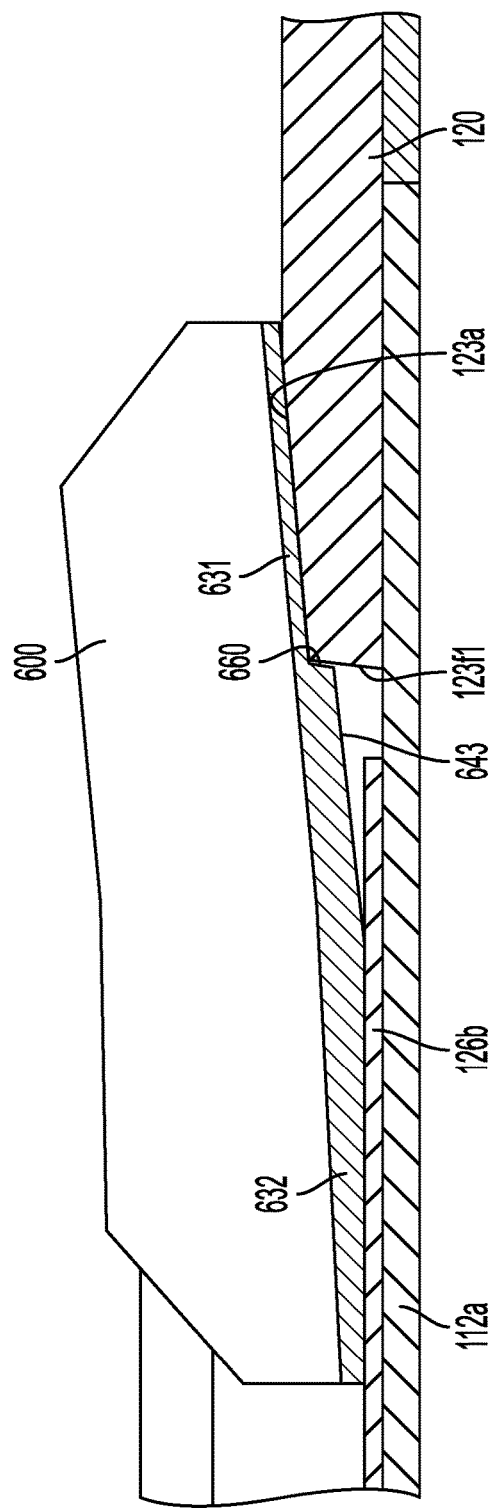
FIG. 6A
FIG. 6B

FUSELAGE STRUCTURE SPLICE

FIELD

This disclosure relates to aircraft structures. More specifically, the disclosed examples relate to apparatuses and methods for a splice fitting to join fuselage sections of aircrafts.

BACKGROUND

Current fuselage sections are made of carbon fiber reinforced polymer (CFRP) joined by join configurations, which utilize at least a strap, stringers, and splice fittings for forming a splice joint between two skin panels. The splice fittings are connected between flanges on the stringers and the strap. Often the splice fittings are flat, and when assembled, the fuselage sections require shims and fillers at numerous locations to align the splice fittings at the splice joint. Although shims are used as compensators to absorb tolerances between mating components and avoid re-machining of parts, the shimming process adds to the cost and time for assembly of fuselage sections.

SUMMARY

The present disclosure provides systems, apparatuses, and methods relating to a fuselage structure splice. In some examples, a fuselage structure splice may include a first panel having a first-panel major face and a first edge, and a strap connected to the first panel. The strap extends along the first edge of the first panel and has first and second strap surfaces. The first strap surface is in contact with the first-panel major face and the second strap surface tapers toward the first panel with distance from the first edge of the first panel. The fuselage structure splice may also include a first stringer mounted on the first-panel major face extending away from the first edge of the first panel and having a first flange mounted to the first-panel major face. The fuselage structure splice may further include a first fitting having a first stringer base portion and a first strap base portion. The first stringer base portion is connected to the first flange of the first stringer and extends along a first line extending in a first plane normal to the first edge of the first panel. The first strap base portion is mounted on the second strap surface and extends along a second line in the first plane. The second line is transverse to the first line and the first strap base portion has a constant thickness along the second line.

In some examples, a fuselage structure splice may include a first panel having a first-panel major face and a first edge, and a strap connected to the first panel. The strap extends along the first edge of the first panel and has a first strap surface in contact with the first-panel major face and a second strap surface tapering toward the first panel with distance from the first edge of the first panel. The fuselage structure splice further may include a stringer mounted on the first-panel major face, extending away from the first edge of the first panel, and having a first flange mounted to the first-panel major face. A fitting for the fuselage structure splice may include an elongate base having a stringer base portion and a strap base portion. The stringer base portion is configured to be connected to the first flange of the stringer to extend along a first line extending in a first plane normal to the first edge of the first panel. The first strap base portion is configured to be mounted on the second strap surface to extend along a second line in the first plane. The second line is transverse to the first line and the first strap base portion has a constant thickness along the second line.

In some examples, a method of making a fuselage structure may include positioning a first panel region of a strap along a first edge of a first panel. The method may include connecting the strap to the first panel. The method may include mounting a first flange of a first stringer to the first panel with the first stringer extending away from the first edge of the first panel. The method may include positioning a first stringer base portion of a first fitting on the first flange of the first stringer with the first stringer base portion extending along a first line extending in a first plane normal to the first edge of the first panel. The method may include positioning a first strap base portion of the fitting on the strap with the first strap base portion extending along a second line extending in the first plane, the second line being transverse to the first line at the first angle, with the first strap base portion having a constant thickness along the second line. The method may include connecting the first stringer base portion to the first flange of the first stringer. The method may include connecting the first strap base portion to the strap.

Features, functions, and advantages may be achieved independently in various examples of the present disclosure, or may be combined in yet other examples, further details of which can be seen with reference to the following description and drawings.

BRIEF DESCRIPTION OF THE DRAWINGS

FIGS. 6A-6B are a cross-sectional views illustrating an example of positioning of a fitting with a stepped structure on a stringer and strap.

DETAILED DESCRIPTION

Figure 1:
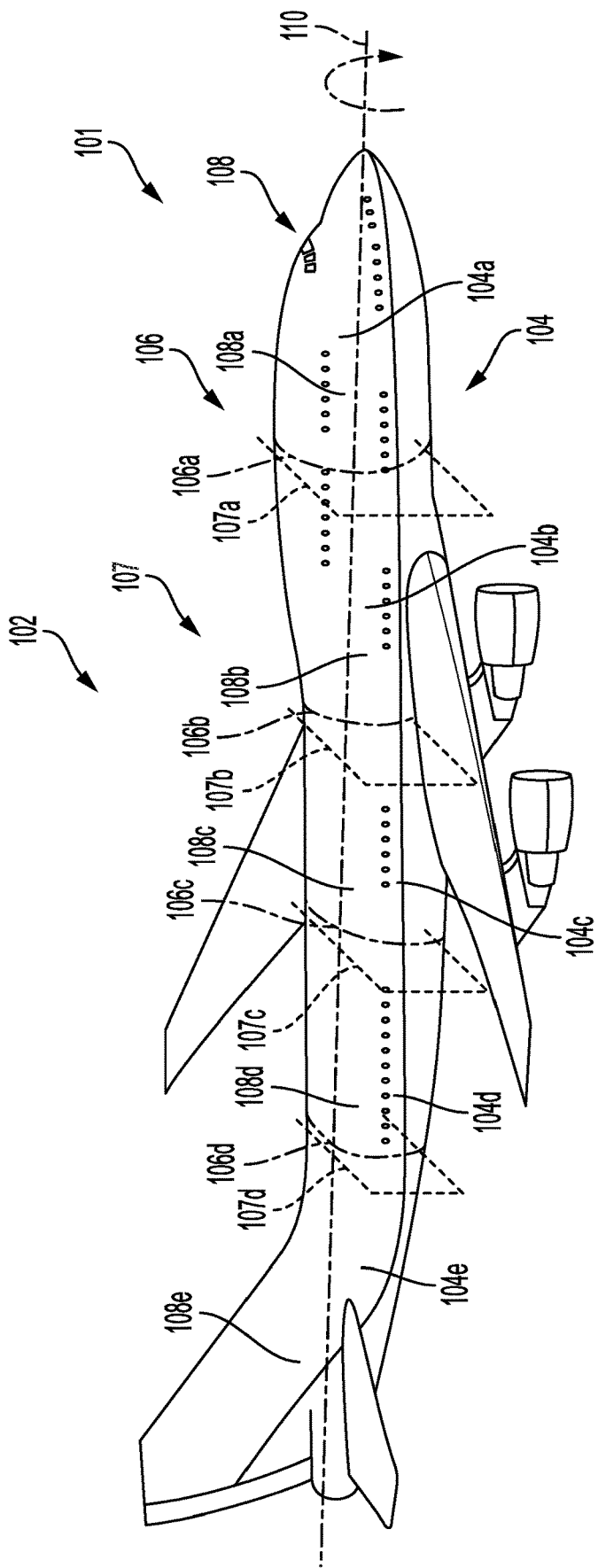
FIG. 1 is a perspective simplified view of an illustrative aircraft assembled in accordance with aspects of the present disclosure.

Various aspects and examples of a fuselage structure splice, as well as related methods, are described below and illustrated in the associated drawings. Unless otherwise specified, a splice fitting in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through D, each of which is labeled accordingly.

Definitions

The following definitions apply herein, unless otherwise indicated.

"Substantially" means to be predominantly conforming to the particular dimension, range, shape, concept, or other aspect modified by the term, such that a feature or component need not conform exactly, so long as it is suitable for its intended purpose or function. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Unless otherwise indicated, the terms "first," "second," "third," etc. are used herein merely as labels, and are not intended to impose ordinal, positional, or hierarchical requirements on the components to which these terms refer. Moreover, reference to, e.g., a "second" component does not require or preclude the existence of a lower-numbered item (e.g., a "first" item) and/or a higher-numbered component (e.g., a "third" item).

"Attached" means to be in such relation that the performance of one influences the performance of the other, may include being connected or mounted, either permanently or releasably, whether directly or indirectly through intervening components, and is not necessarily limited to physical connection(s).

Overview

In general, a complete fuselage structure splice typically includes a plurality of individual fittings distributed along a splice joint. Each of the individual fittings is configured to connect between a splice-joint strap and a flange of one of a plurality of stringers. The fitting may include a first end connected to a second end. An intermediate section may extend between the ends. As is described below, the fitting preferably has an end that attaches to the strap and extends at an angle relative to an opposite end that attaches to a stringer flange. The strap end of the fitting also preferably has a uniform thickness. Additionally, an intermediate section may extend at between the fitting ends at an angle relative to one or both of the two fitting ends. Such an intermediate section may orient and provide a transition of the surfaces of the fitting ends with respective strap and the stringer flange surfaces. The different orientations of the two fitting ends accommodates differences in thickness and orientation of the strap and the stringer flange in the fuselage structure splice and facilitates assembly of an overall shimless splice joint. The disclosed fitting enables commonality and use of standard components for joining multiple pairs of fuselage sections.

Examples, Components, and Alternatives

The following sections describe selected aspects of exemplary as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Splice Fitting

As shown in FIGS. 1-5, this section describes an illustrative splice fitting 100. Splice fitting 100 is a thermoplastic circumferential splice fitting and is a first example of a splice fitting that may be used in a fitting splice of a splice joint for joining airplane sections, described above.

FIG. 1 is a perspective view of an aircraft 101 having a fuselage 102 that may be configured with splice joints having splice fittings, such as splice fitting 100. Fuselage 102 includes a plurality of substantially cylindrical fuselage sections 104 (identified individually as fuselage sections 104a-e) abutting each other along joining lines, called circumferential splice joints 106 (identified individually as splice joints 106a-d). The circumferential joints 106 define planes 107 (identified individually as splice joints 107a-d) perpendicular to a longitudinal axis 110 of the fuselage. The joining lines and circumferential joint areas of splice joints 106 provide strength and transfer forces along the fuselage to withstand high stresses the aircraft is subjected to during flight.

In an example, the fuselage section 104a may be a forward body section, and the fuselage section 104b may be a first mid-body section. The splice joint 106a may represent a section 41-43 full body join connecting the forward body section to the first mid-body section. Similarly, the fuselage section 104c may be a second midbody section, the fuselage section 104d may be a third midbody section, and the fuselage section 104e may be an aft body section. Likewise, the splice joint 106b may represent a section 43-44 crown join connecting the first mid-body section to the second mid-body section; the splice joint 106c may represent a section 44-46 crown join connecting the second mid-body section to the third mid-body section; and the splice joint 106d may represent a section 46-47 full body join joining the third mid-body section to the aft-body section.

Each fuselage section 104a-e may include a composite skin 108, shown as individual skins 108a-e, extending circumferentially around the longitudinal axis 110 of the fuselage 102. Throughout this disclosure, the term "fuselage section" is used for convenience to refer to any airplane shell structure extending circumferentially around an axis. It can be appreciated by one skilled in the art that fuselage sections 104a-e may not be limited to generally cylindrical structures, but may include structures having circular, elliptical, oval, egg-shaped, rectilinear, tapered, or other cross-sectional shapes. In addition, in one example, the fuselage sections 104 can be "one-piece" fuselage sections in which the composite skins 108 are "one-piece" skins extending continuously circumferentially around the longitudinal axis 110. In other examples, however, the skins 108 can be formed from two or more skin segments spliced or otherwise joined together to form the circumferential fuselage section.

In the present example, each of the composite skins 108 has a cross-sectional width of at least about 10 feet, such as about 15 feet to about 35 feet. In a specific example, the composite skins 108 may have a cross-sectional width of about 18 feet. The thickness of the skin may also vary for the different fuselage sections. In a specific example the composite skin thickness may range between 18-20 plies of thermoplastic material.

FIGS. 2A-2D together illustrate assembly structures 101a-c, respectively, illustrating an exemplary assembly sequence for joining the first fuselage section 104a to the second fuselage section 104b in accordance with aspects of the present disclosure. A similar assembly structure may be used for joining other fuselage sections, 104b to 104c, 104c to 104d, and 104d to 104e, or for joining two panels or work pieces.

Figure 2A:
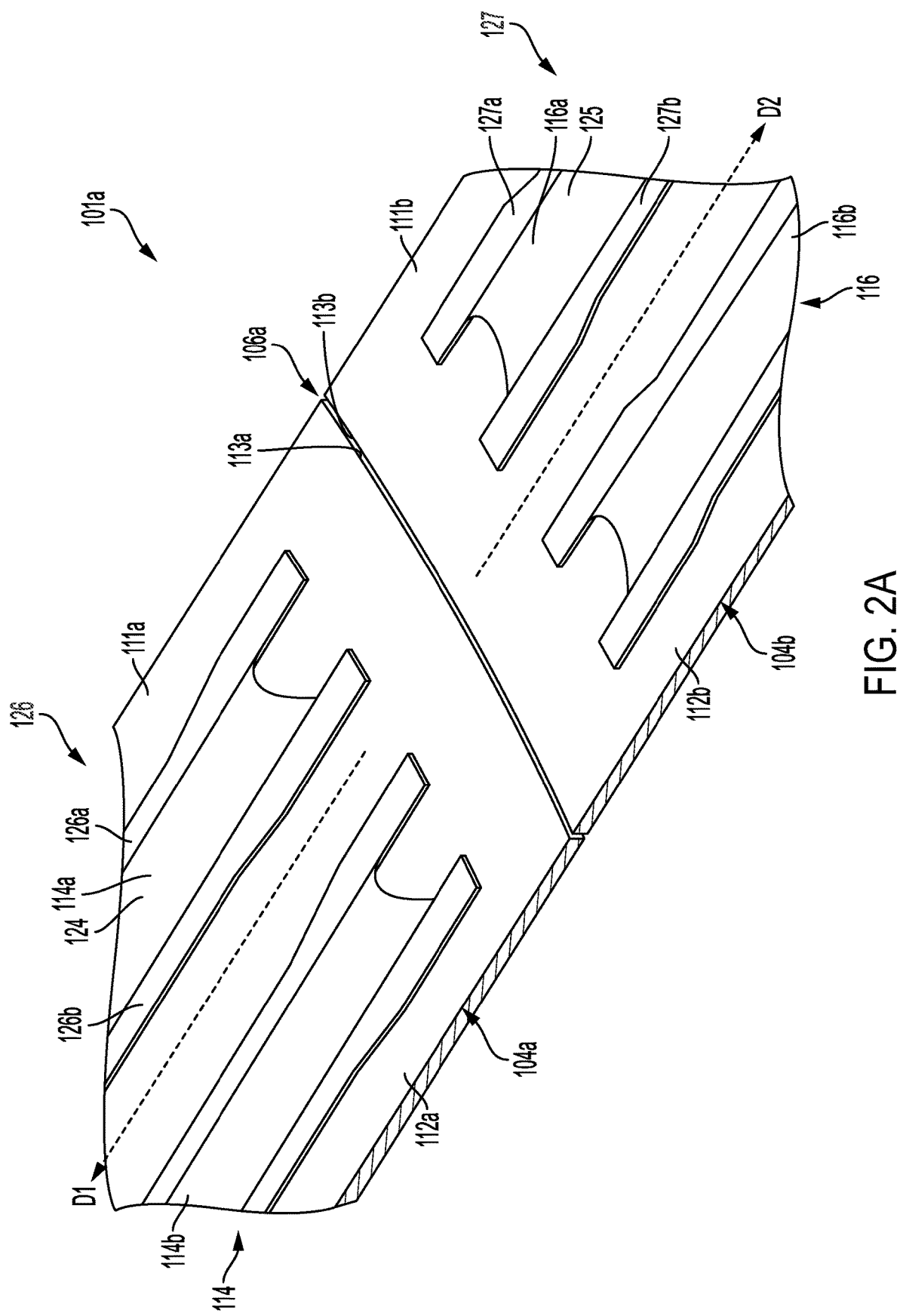
FIGS. 2A-2B are partial isometric views illustrating an example of a build of a splice joint between adjacent fuselage sections of the aircraft of FIG. 1.

Referring first to FIG. 2A, is an enlarged isometric view from within the fuselage 102 (FIG. 1) of structural assembly 101a, which is a portion of the first splice joint 106a. The portion of the first fuselage section 104a illustrated in FIG. 2A includes a first panel 112a with a first panel major face 111a and a first edge 113a. The portion of the second fuselage section 104b illustrated in FIG. 2A includes a second panel 112b with a second panel major face 111b and a second edge 113b facing first edge 113a. The second edge 113b of the second panel 112b is positioned in edgewise alignment or butted up with the first edge 113a of the first panel 112a to form the splice joint 106a with the first panel major face in alignment with the second panel major face.

Those skilled in the art will recognize that in certain implementations, the first panel and the second panel may not be in complete contact along the entire length of the splice joint 106a, when butted up together. Those skilled in the art will also recognize that any gaps defined between butted up first and second panels may be filled (e.g., with shims, fillers, etc.) or otherwise dealt with by other known methods.

In this example, a plurality of stringers 114 (identified individually as stringers 114a-b) may be attached to first panel major face 111a of the first panel 112a. The plurality of the stringers extend away from the splice joint 106a in a first direction D1 and along the line of first direction D1 parallel to the longitudinal axis 110 of aircraft 101, and transverse to the splice joint and panel first edge 113a. Each of the stringers 114 may include a plurality of flanges and a raised portion 124 between the flanges and projecting away from the face of first panel 112a. In the present example, each of the stringers 114 has a pair of flanges, identified individually as a first flange 126a and second flange 126b positioned on opposite sides of raised portion 124. The flanges 126a and 126b are attached directly to the first panel 112a and the stringers 114a-b are configured to reinforce, stiffen, and strengthen the first panel 112a. In the illustrated example, the raised portion of stringers 114 each have a C-shaped or U-shaped cross-sectional geometrical shape. In other examples, however, the stringers 114 can have other cross-sectional shapes, including "hat" shapes, "L" shapes, inverted "T" shapes, "I" shapes, or other geometrical shapes.

The second panel 112b can be at least generally similar in structure and function to the first panel 112a described above. Accordingly, the second panel 112b may include a plurality of stringers 116 (identified individually as stringers 116a-b) attached to a second panel major face 111b of the second panel 112b. The stringers extend away from the splice joint 106a in a second direction D2 opposite to D1 and along the line of second direction D2, and parallel to the aircraft longitudinal axis 110. Each of the stringers 116 may include a raised portion 125 projecting away from the second panel 112b, and a plurality of flanges (identified individually as first flanges 127a and second flanges 127b). The flanges are attached directly to the second panel 112b and stringers 116a-b are configured to reinforce, stiffen, and strengthen the second panel 112b. In the illustrated example, each of the stringers 116 have a C-shaped or U-shaped cross-sectional geometrical shape. In other examples, however, the stringers 116 can have other cross-sectional shapes, including "hat" shapes, "L" shapes, inverted "T" shapes, "I" shapes, or any other appropriate geometrical shape.

In the present example, the set of stringers 114a-b attached to the first panel and the set of stringers 116a-b attached to the second panel have the same geometrical shape and are aligned to provide enhanced structural support to the overall fuselage structure. For instance, the stringer 114a of the first panel is collinear with the stringer 116a of the second panel along a line parallel to the longitudinal axis 110. The raised portions 124 and 125 are collinear and their respective flanges 126a-126b aligned with flanges 127a-127b across the splice joint 106a. In other examples, the set of stringers 114a-b attached to the first panel and the set of stringers 116a-b attached to the second panel may have different geometrical shapes and may be arranged in an alternating or irregular fashion.

Figure 2B:
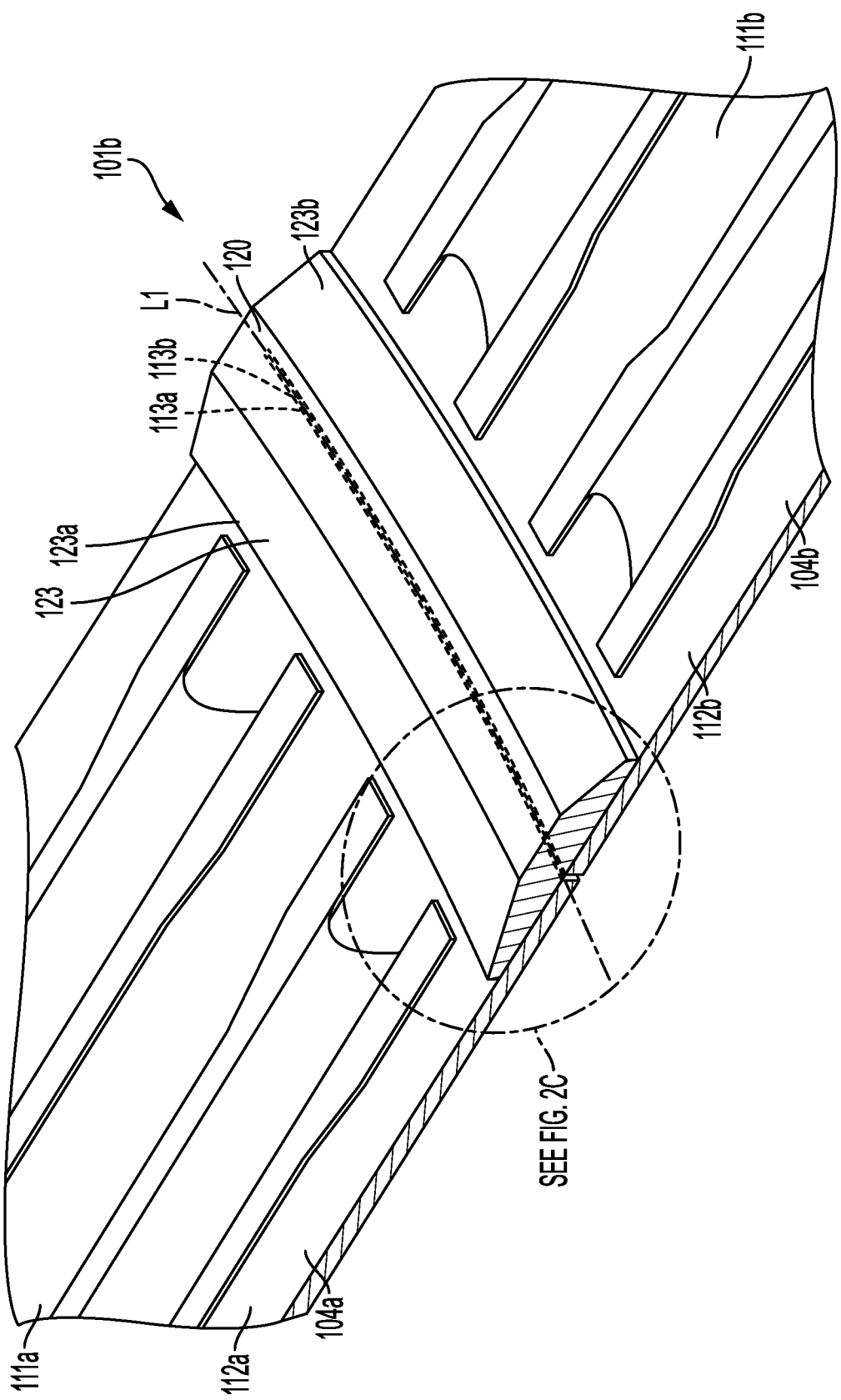

FIG. 2B depicts a structural assembly 101b, which includes an elongate strap 120 that is attached to the assembly structure 101a illustrated in FIG. 2A. The strap 120 is attached to the first panel major face 111a along the first edge 113a and the second panel major face 111b along the second edge 113b to overlay on and to bridge the splice joint 106a formed by the first panel 112a and the second panel 112b. The strap 120 is attached all along the splice joint extending circumferentially around the fuselage to bridge the fuselage section 104a to section 104b.

The strap may include a strap first-surface 121 (or strap bottom surface) and an opposite strap second-surface 123 (or strap top-surface as viewed in FIG. 2B). The strap first surface 121 is in contact with the first panel major face 111a and the second panel major face 111b. The strap first-surface generally has a smooth surface to provide continuous contact area for attachment to the first and second panel major faces.

Figure 2C:
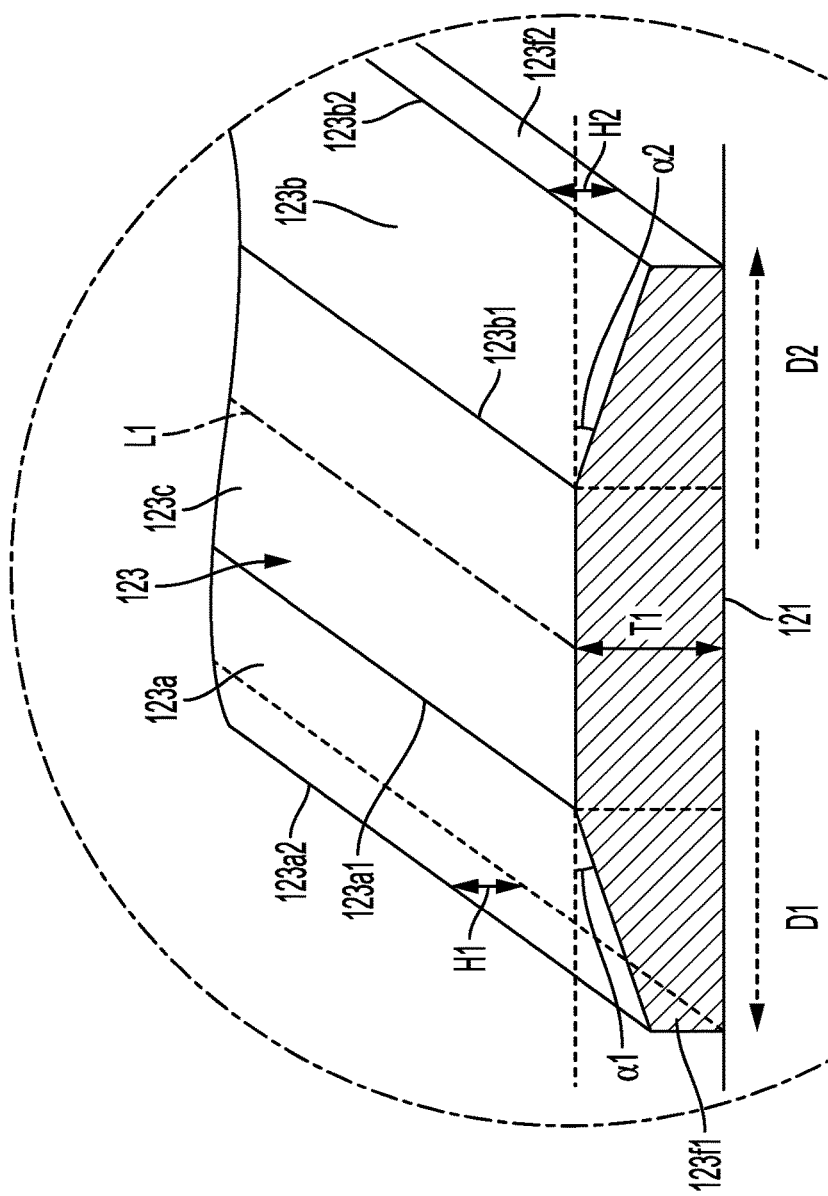
FIG. 2C is an enlarged view of a portion of FIG. 2B.

As shown as an enlarged portion in FIG. 2C, the strap second surface 123 may include a first panel region 123a extending lengthwise on the first panel major face 111a along the first edge 113a. In the first panel region the strap has a thickness normal to strap first-surface 121 that tapers with distance in the direction D1 from the first edge 113a of the first panel major face and the splice joint 106a. Similarly, the strap second surface 123 includes a second panel region 123b extending lengthwise on the second panel major face 111b along the second edge 113b. In the second panel region the strap has a thickness normal to strap first-surface 121 that tapers with distance in the direction D2 from the second edge 113b of the second panel major face and the splice joint 106a.

Additionally, the strap second surface 123 includes a strap middle region 123c in between the first panel region 123a and the second panel region 123b. The strap has a constant thickness T1 in the strap middle region 123c. The first panel region 123a extends from a first primary edge 123a1 forming an edge of strap middle region 123c to a first secondary edge 123a2 at a first angle α1 relative to the orientation of the strap middle region of the strap second surface. The first secondary edge 123a2 is spaced from the strap first surface 121 by a distance H1 and the strap includes a strap first side face 123f1 connecting the first secondary edge 123a2 to the strap first surface 121. The strap first side face is transverse to both first panel region 123a of the strap second surface and strap first surface 121, and has a height of H1 and a length equivalent to the length of the strap 120 around the circumferential joint 106a.

The second panel region extends from a second primary edge 123b1 to a second secondary edge 123b2 at a second angle α2 relative to the orientation of the strap middle region 123c of the strap second surface along direction D2. The second secondary edge 123b2 is spaced from the strap first surface 121 by a distance H2 and the strap includes a strap second side face 123f2 connecting the second secondary edge 123b3 to the strap first surface 121. The strap-second side face 123f2 is transverse to both second panel region 123b of the strap second surface and strap first surface 121, and has a height of H2 and a length equivalent to the length of the strap 120 around the circumferential joint 106a.

In the present example, the elongate strap extends along a mid-line L1 extending along the length of the strap. Line L1 is parallel to and extends along the circumferential splice joint 106a in the plane 107a shown in FIG. 1, which plane is orthogonal to the longitudinal axis 110. The mid-line L1 traverses a circular path concentric with the fuselage sections 104a and 104b. The plane 107a represents a plane of symmetry for the strap with the first and second panel regions being symmetrical to each other. The first and second primary edges of the strap second surface are equidistant from the midline. Likewise, the first and second secondary edges of the strap second surface are equidistant from the midline. The angle of tapering α1 is equivalent to angle α2. The heights H1 and H2 of the first and second side faces 123f1 and 123f2 are equivalent.

The strap 120, attached to the respective interior first panel major face of the first panel 112a and the interior second panel major face of the second panel 112b, joins the two panels while maintaining a smooth, aerodynamic surface on the exterior of the fuselage 102.

In one example, the strap 120 may include composite materials, such as graphite-epoxy or similar material. In other examples, the strap 120 may include other materials, including metallic materials such as aluminum, titanium, steel, etc. The strap 120 may be attached to the first panel 112a and the second panel 112b with a plurality of fasteners, similar to fasteners 160 shown in FIG. 2D, extending through the strap 120 and the first panel 112a and the second panel 112b. In other examples, the strap 120 may be bonded to the first panel 112a and the second panel 112b, or bonded and fastened to the first panel 112a and the second panel 112b. Further, in an example, the strap 120 may extend continuously, or at least approximately continuously, around the splice joint 106a. In other examples, the strap 120 may be segmented around the splice joint 106a. For example, the splice joint 106a may include six segments of the strap 120. In other examples, the splice joint 106a may include more (e.g., eight) or fewer segments of the strap 120.

Figure 2D:
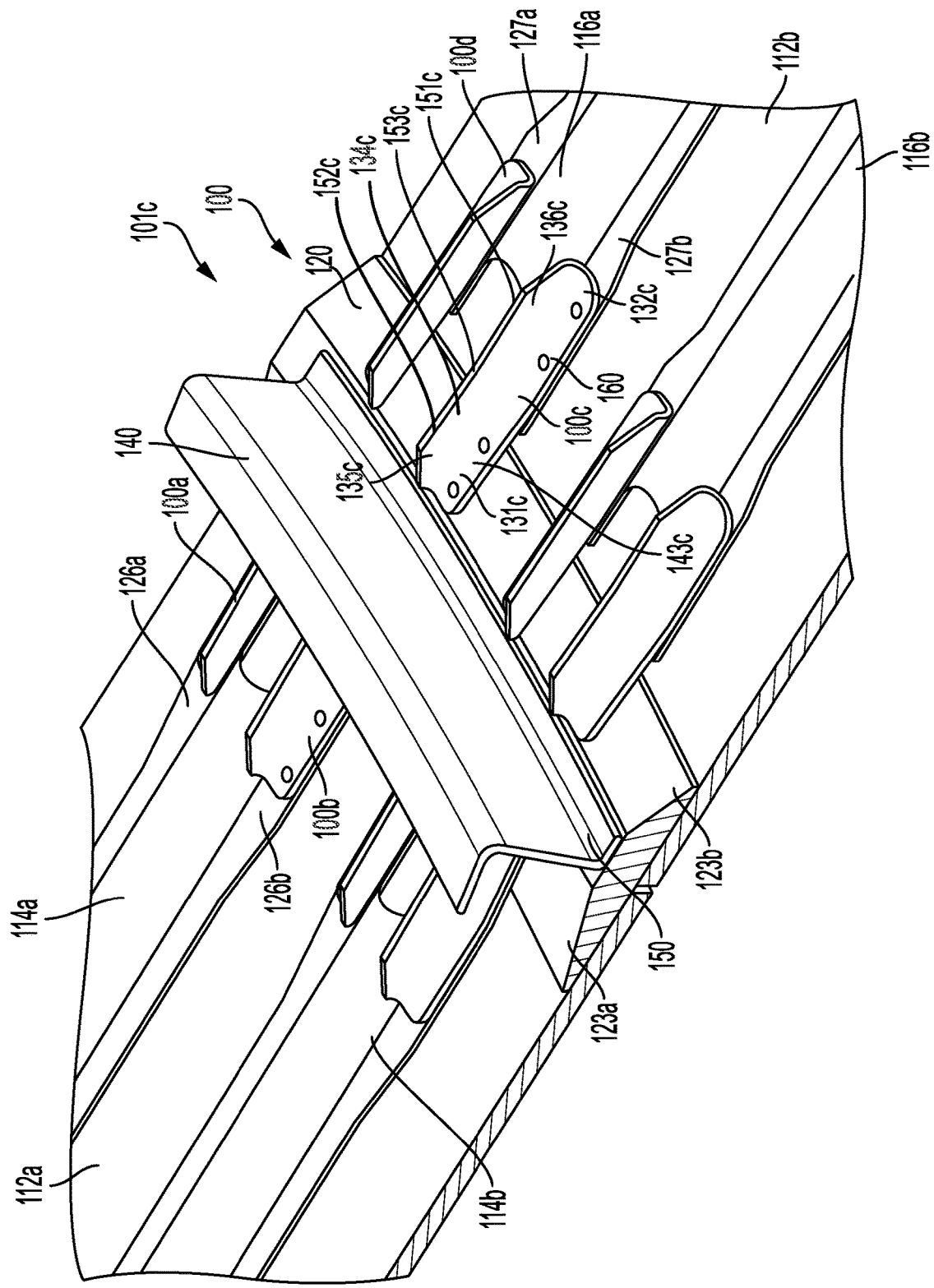
FIG. 2D is a partial isometric view illustrating an example of a build of a splice joint between adjacent fuselage sections of the aircraft of FIG. 1

In the illustrated example, the strap 120 may be at least approximately as thick as the skins 108, but thicker than the adjacent flanges 126, 127 of the stringers 114, 116, identified in FIGS. 2A and 2D. In other examples the strap 120 may be thinner than the adjacent flanges 126, 127 of the stringers 114, 116.

FIG. 2D depicts a structural assembly 101c, which includes a plurality of splice fittings 100 and a frame 140 that is attached to the structural assembly 101b illustrated in FIG. 2B. For example, a first fitting 100a is positioned relative to the stringer flange 126a of the stringer 114a attached to the first panel 112a, and relative to the first panel region 123a of the strap 120. Similarly, a second fitting 100b is positioned relative to the stringer flange 126b of the stringer 114a, and relative to the first panel region 123a of the strap 120. Further, a third fitting 100c is positioned relative to the stringer flange 127b of the stringer 116a attached to the second panel 112b, and relative to the second panel region 123b of the strap 120. A fourth fitting 100d is positioned relative to the stringer flange 127a of the stringer 116a, and relative to the second panel region 123b of the strap 120. A pair of fittings 100 are similarly positioned relative to the flanges on each stringer 114, 116 and relative to the strap 120.

Figure 3:
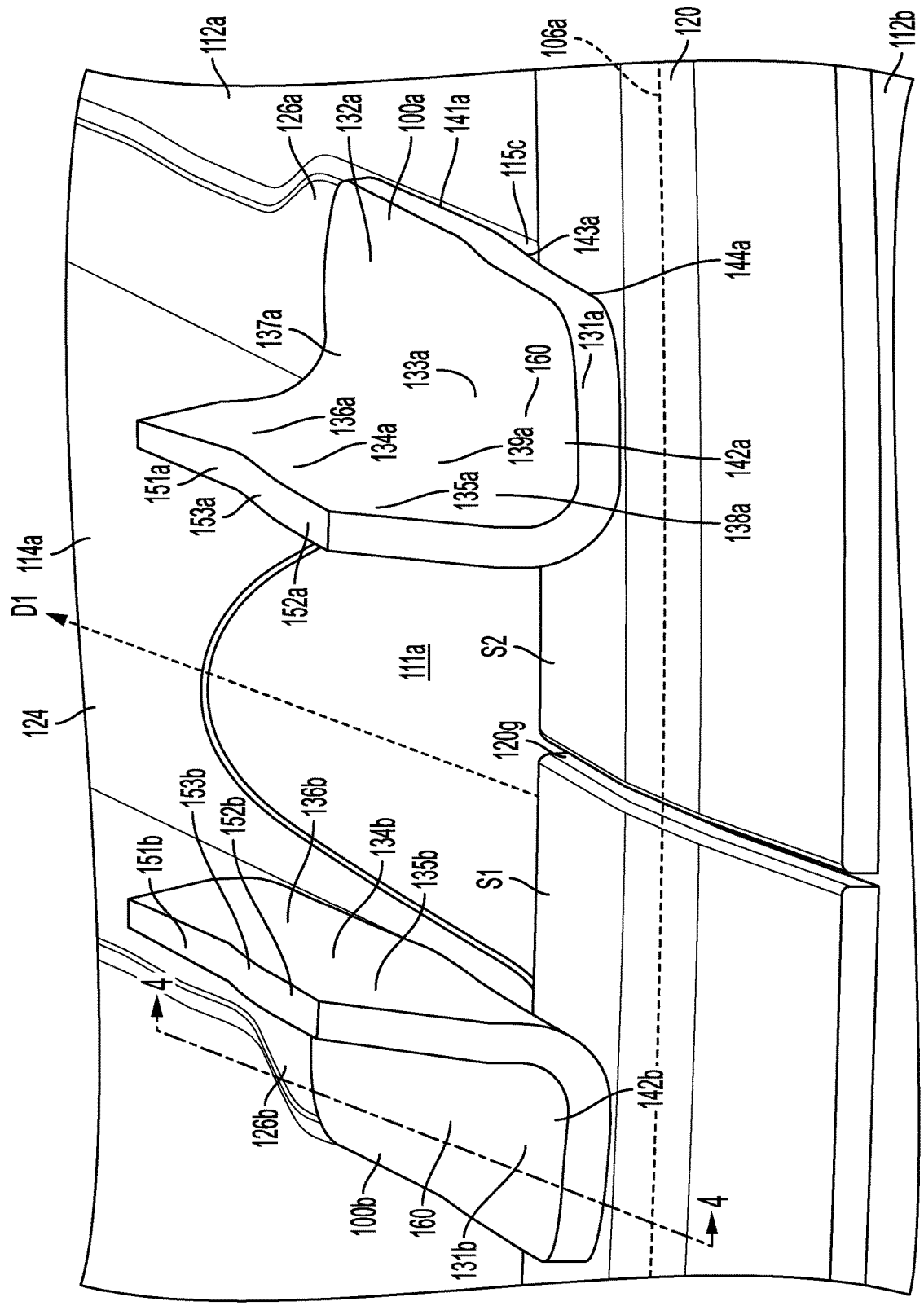
FIG. 3 is an enlarged isometric view of a portion of the splice joint of FIG. 2D showing fittings attached to a stringer and a strap assembly.
Figure 4:
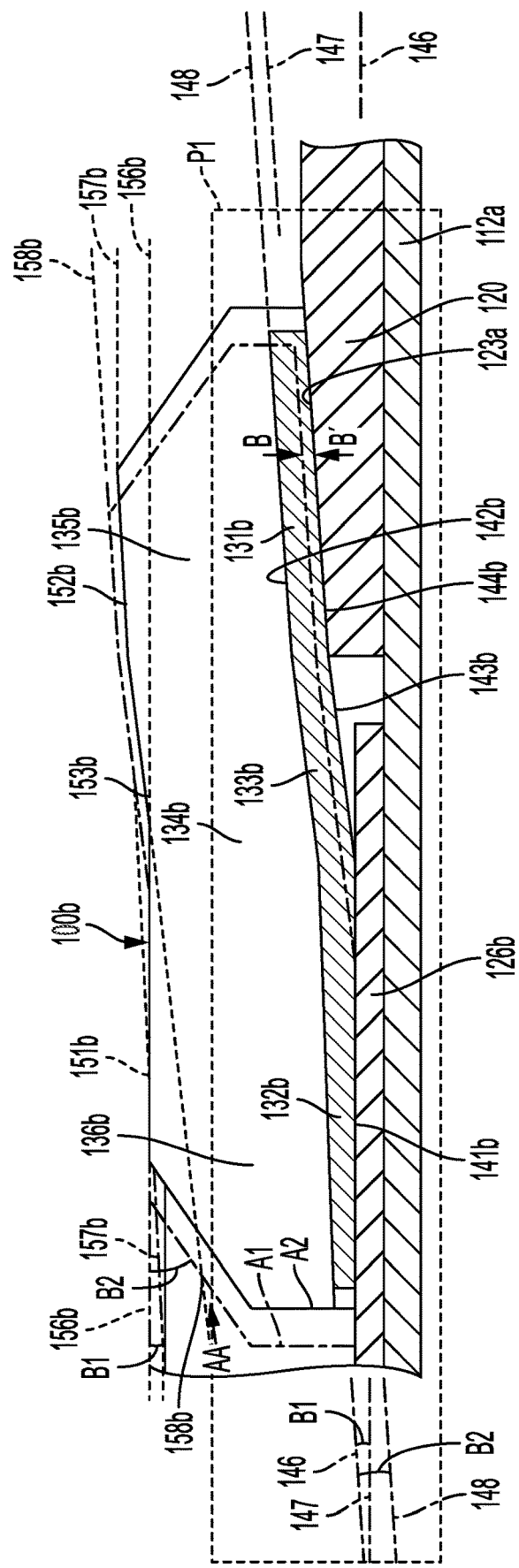
FIG. 4 is a cross section of a fitting attached to a stringer and strap of the splice joint of FIG. 2D.

As also shown in greater detail in FIGS. 3 and 4 for fittings 100a and 100b, each of the fittings 100 preferably may include a base and a projection forming a general "L" configuration. The base includes a strap base portion and a stringer base portion. Thus, fittings 100a-d have respective bases with respective strap base portions 131a-d and stringer base portions 132a-d. Further, the fittings 100a-d include respective stringer projection portions 136a-d extending transversely from the respective stringer base portions 132a-d, and respective strap projection portions 135a-d extending transversely from the respective strap base portions 131a-d. As seen in the figures, the strap base portion 131c of the fitting 100c is connected to the strap 120. The stringer base portion 132c of the fitting is connected to the flange 127b of the stringer 116a. In the illustrated example, the fitting 100c includes a stringer projection portion 136c extending transversely from the stringer base portion 132c, and a strap projection portion 135c extending transversely from the strap base portion 131c. A plurality of fasteners 160 extend through the strap base portion 131c and the underlying structures (i.e., the strap 120, and the associated panel), and through the stringer base portion 132c and the underlying structures (i.e., the flange 127b, and the associated panel). Corresponding fasteners attach each of the fittings 100 to the underlying structures to form a structural load path across the splice joint 106a.

The assembly structure 101c may include a frame 140 that extends circumferentially about at least a portion of the splice joint 106a between adjacent fuselage sections 104a and 104b. The frame 140 may be attached to the strap 120 along the strap middle region 123c between longitudinally opposed fittings 100. In the illustrated example, the frame 140 may have a generally Z-shaped cross-section configuration with a lower foot 150 fastened to the strap 120. The lower foot 150 may be segmented into a plurality of feet, as illustrated in FIG. 2D. While a Z-shaped frame 140 is shown, those skilled in the art will appreciate that any suitable frame that resists bending may be used, such as a C-shaped frame, an I-shaped frame, a J-shaped frame or the like. Alternatively, the frame 140 can be omitted.

The frame 140 may be formed of a composite material, such as CFRP or similar material, such as the same composite that forms the strap 120 or the fittings 100. Alternatively, the frame 140 may be formed of a metallic or other material, such as aluminum or titanium.

The fittings 100, the stringers 114 and 116, the strap 120, the frame 140, and the skins 108 may be made of composite materials, including graphite-epoxy and/or other suitable composite materials. For example, in one example, the skins 108 can be manufactured with toughened epoxy resin and carbon fibers. In this example, the skins 108 may include fiber tape pre-impregnated with resin (i.e., "prepreg") and outer plies of prepreg fabric. In another example, the strap 120 and the fittings 100 may also be manufactured from epoxy resin and carbon fibers. The skins 108, the strap 120, and the fittings 100 can have quasi-isotropic lay-ups, i.e., lay-ups having an equal (or approximately equal) number of plies with 0, +45, −45, and 90 degree orientations. The stringers 114 may have axial-dominated fiber orientations. In other examples, the skins 108, the strap 120, the fittings 100, and the stringers 114, 116 may have other fiber orientations.

One advantage of using composite materials instead of metals is that the fittings 100 and the underlying structures (e.g., the skins 108 and the stringers 114) will have at least generally similar coefficients of thermal expansion. As a result, temperature fluctuations experienced during operation of the aircraft 101 (FIG. 1) will not cause disparate thermal expansion between the fittings 100 and the underlying structures, and hence will not induce significant stresses in the splice joints 106 a-d. In other examples, however, the fittings 100 can include metal materials such as aluminum, titanium, steel, etc. The use of metals may be appropriate in those situations in which the aircraft is not expected to experience wide temperature fluctuations during operation.

In addition to composites and metal materials, in yet other examples, the skins 108, the strap 120, the fittings 100, and the stringers 114, 116, and combinations thereof, can include other materials, including hybrid materials such as fiber/metal laminates. Such laminates include fiberglass/aluminum laminates and titanium reinforced graphite laminates (Ti/Gr). One hybrid laminate that includes alternating layers of aluminum and fiberglass is referred to as glass laminate aluminum reinforced epoxy (GLARE). This laminate may offer better fatigue properties than conventional aluminum. A Ti/Gr laminate may offer weight advantages over conventional aluminum or graphite-epoxy, but this laminate may also be more expensive.

A feature of the splice joint 106a illustrated in FIG. 2D is that the fittings 100 overlap the strap 120. One advantage of this feature is that it provides a fail-safe, redundant load path in the unlikely event that a crack or other structural flaw propagates through a portion of the strap 120. In such an event, the fittings 100 in combination with the strap can carry the structural load across the splice joint 106a. In addition, the fittings 100 also provide a redundant load path across the splice joint 106a from where the opposing stringers 114, 116 respectively terminate. Further, if a segmented strap 120 is used, then the fittings 100 can also be used as splice plates for adjacent strap segments. Another feature of the splice joint 106a is that the ends of the stringers 114, 116 are left open. One advantage of this feature is that it enables moisture caused by condensation and other sources to escape the stringers 114, 116.

Another feature of the fittings 100 of the illustrated example is the stringer projection portions 136a-d can add stiffness to the fittings 100. The projection portions also added stiffness to the splice between the stringers and strap, particularly when the fittings are positioned as shown with the projection portions proximate to the raised portions 124 of the stringers 114, 116. One advantage of this configuration is that it can increase the stability of the splice joint 106a, especially under compression loads.

Referring to FIGS. 2D, 3 and 4, FIG. 3 is a close-up front perspective view of the fittings 100a and 100b attached to first flange 126a and the second flange 126b, respectively, of the stringer 114a, and attached to the strap 120 (without frame 140) extending along the splice joint 106a. The stringer 114a extends along the first panel in the direction D1 parallel to the longitudinal axis of the aircraft and transverse to edge 113a of panel 112a. The stringer 114a includes the second flange 126b, spaced apart from the first flange and mounted on the first panel major face 111a. The raised portion 124 between the first and second flanges extends away from the first panel major face beyond the first and second flanges.

The strap 120 is superimposed on the splice joint 106a to bridge the first panel 112a to the second panel 112b. The strap 120 may be placed relative to the stringer 114a such that the first panel region 123a of the strap is placed in near proximity to the stringer termination ending 115c. The strap may include adjacent strap segments S1 and S2 joined by a sealant at a gap 120g. Further, the gap may include a chamfered feature for accommodating the sealant.

In this example, the first fitting 100a includes an intermediate base portion 133a, which bridges the first strap base portion 131a to the first stringer base portion 132a. The first fitting further includes an intermediate projection portion 134a bridging the strap projection portion 135a to the first stringer projection portion 136a. The intermediate projection portion 134a extends transversely from the intermediate base portion 133a, giving the fitting a general "L" shape. A radiused first joint 137a joins the first stringer base portion to the first stringer projection portion, a radiused second joint 138a joins the first strap base portion to the first strap projection portion and, a radiused third joint 139a joins the first intermediate base portion to the first intermediate projection portion.

The first stringer base portion 132a includes a first fitting surface 141a that is in contact with the first flange of the first stringer. The first strap base portion includes a second fitting surface 142a that is opposite to the strap. The intermediate base portion 133a includes a third fitting surface 143a facing the first panel. The first strap base portion includes a fourth fitting surface 144a facing the strap and the first panel. The first stringer projection portion includes a first distal edge 151a that is distal of the first stringer base portion. The first strap projection portion has a second distal edge 152a that is distal of the first strap base portion. The intermediate projection portion includes a third distal edge 153a that is distal of the first intermediate base portion.

The first stringer projection portion 136a of the fitting 100a is positioned proximate to the raised stringer portion 124, preferably in a distance range of 0.09-0.1 inches, to provide stability of the fitting in compression and decrease out-of-plane loading on the stringer 114c and the first panel 112a.

The various base and projection portions are illustrated as separate portions of the fitting for ease of illustration. Preferably the fittings are made of a single unitary structure with the various portions having the characteristics described. In some examples, the transitions between portions may be less well-defined.

The second fitting 100b attached to the flange 126b of the stringer 114a is substantially a mirror image of fitting 100a, described above. Accordingly, corresponding parts are numbered with a "b" instead of an "a." As seen in FIG. 3, a second strap base portion 131b includes a second fitting surface 142b that is opposite to the strap. A second stringer projection portion 136b includes a first distal edge 151b that is distal of the second stringer base portion. A second strap projection portion has a second distal edge 152b that is distal of the second strap base portion. An intermediate projection portion 134b includes a third distal edge 153b that is distal of the second intermediate base portion.

The first and second fittings are arranged in a mirror image relationship relative to the stringer raised portion 124 disposed between the first and second flanges. The first and second stringer projection portions are placed on opposite sides of the stringer raised portion 124, as shown, with the first and second stringer base portions extending away from the stringer raised portion 124. A plurality of fasteners 160 secure the fittings 100a and 100b to the flanges 126a and 126b of stringer 114a and the strap 120, and to the first panel 112a.

Referring briefly again to FIG. 2D, the third fitting 100c is attached to the second flange 127b of the stringer 116a. The third fitting is substantially similar to first fitting 100a, described above. Accordingly, corresponding parts are correspondingly numbered. The third stringer base portion 132c includes a first fitting surface that is in contact with the second flange 127b of the third stringer 116c. The third strap base portion 131c includes a second fitting surface 143c (i.e., the exposed surface) that is opposite to the strap. The third stringer projection portion 136c includes a first distal edge 151c that is distal of the third stringer base portion. The third strap projection portion has a second distal edge 152c that is distal of the third strap base portion. The third intermediate projection portion 134c includes a third distal edge 153c that is distal of the third intermediate base portion.

The second and third fittings are arranged in a mirror image relationship relative to the plane 107a of the circumferential splice joint 106a. The second and third fittings are placed on respective opposite sides of the strap 120 with the second and third stringer base portions extending in opposite directions from the splice joint 106a. A plurality of fasteners 160 secure the fittings to respective the stringers and the strap, as well as to the respective panels.

FIG. 4 is a schematic cross-sectional view taken along line 4-4 of FIG. 3. The view represents an example of a portion of the splice joint showing a side view of the fitting 100b in a fitting splice. This example is representative of the fittings used for the joint splice.

In this example, the first fitting surface 141b of second stringer base portion 132b is in contact with the second flange 126b mounted on the first panel 112a and extends along a first line 146 in a first plane P1 normal to the first edge of the first panel. Plane P1 corresponds to the plane of the view of FIG. 4. The second strap base portion 131b is in contact with the first panel region 123a of the second surface of the strap 120 mounted on the first panel 112a and extends along a second line 147 in the plane P1. The second fitting surface 142b, opposite to the strap extends along the strap in the first plane P1 parallel to the second line 147. The third fitting surface 143b of the intermediate base portion 133b, facing the panel 112a, extends along a third line 148 in the plane P1. The second line 147 is transverse to the first line 146 and the third line 148 is transverse to both the first and second lines 146, 147.

As shown in FIG. 4, the second strap base portion of the fitting includes a fourth fitting surface 144b facing the second strap surface, and is opposite to the second fitting surface 142b. The fourth fitting surface is substantially parallel to the second fitting surface and thus the first strap base portion 131b has a constant thickness along the second line 147.

The second stringer base portion 132b has a thickness along the second flange which tapers with distance from the strap. In other words, the thickness of the second stringer base portion becomes progressively narrower as the distance from the strap increases. In an example, the tapering may include a ramp rate of 40:1. The stringer base portion decreases in thickness by a ratio corresponding to one mm in a direction orthogonal to the first surface after traversing a distance of 40 mm along the first line 146 in a direction away from the strap.

The second distal edge 151b of the first stringer projection portion 136b extends along a first edge line 156b and is parallel to the first line 146. The second distal edge 152b of the second strap projection portion 135b extends along a second edge line 157b parallel to the second line 147. The third distal edge 153b of the intermediate projection portion 134b extends along the third edge line 158b parallel to the third line 148.

The second line 147 forms a first acute angle B1 with the first line 146. The third line 148 forms a second acute angle B2 with the first line 146. The second edge line forms the first acute angle B1 with the first edge line. The third edge line forms the second acute angle B2 with the first edge line. In an example, the first acute angle may be less than the second acute angle. The acute angles B1 and B2 are selected so that the fitting surface 144b of the strap base portion will be flush with the strap second surface when the fitting surface 141b of the stringer base portion is flush with the contact surface of the stringer flange 126b. In other examples, the first acute angle may be more than the second acute angle.

The above described relative angled portions of the fitting are inbuilt in the design of the fitting 100b, which allows for manipulation of the fitting relative to the surfaces of the flange 126b and the first panel region of the strap to obtain mating of fitting surfaces with the stringer and strap surfaces. The fitting 100b may be moved from position A1, shown in dash-dot lines, to position A2 in a direction showed by the arrow AA to obtain a continuous mating of the strap base portion and the first panel region of the strap, eliminating the gap represented by the distance between the arrows B and B'. The intermediate base portion 133b specifically accounts for differences in thickness, relative position, and orientation of the strap and the stringer flange in the fuselage structure splice and facilitates an overall shimless splice joint.

Figure 5:
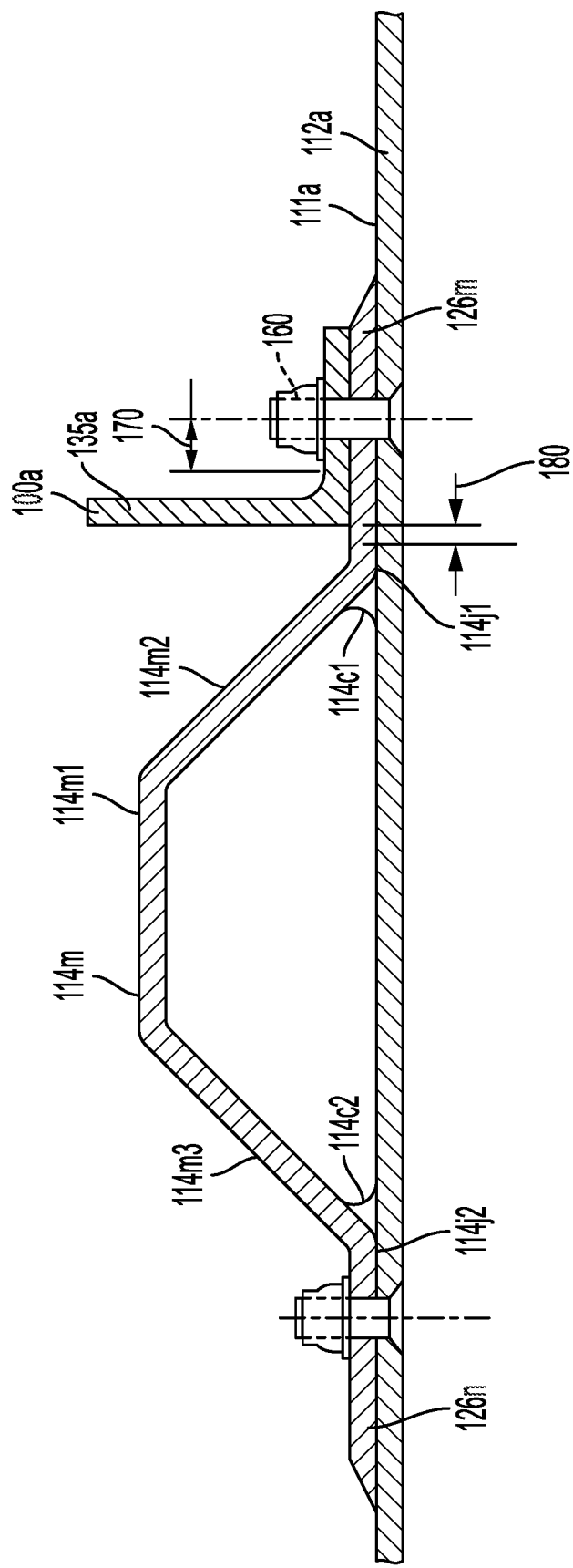
FIG. 5 is a cross-sectional view of a stringer with an attached fitting.

In an example shown in FIG. 5, a stringer 114m is attached to the first major face 111a of the first panel 112a. The stringer 114m has a hat shaped structure, including a cap section 114m1 and first and second side walls 114m2 and 114m3 extending from opposing side portions of the cap section.

The stringer 114m further includes first flange 126m extending from first sidewall 114m2, and second flange 126n extending from second sidewall 114m3. First and second flanges 126m and 126n extend away from each other in opposing directions and can be parallel to cap section 114m1. For example, the first and second flanges can be coplanar and can define a plane that is parallel to a plane generally defined by the cap section. First and second flanges 126m and 126n have respective bottom surfaces, as viewed in the figure, that are attached to first panel 112a so that stringer 114m reinforces, stiffens, and strengthens the first panel. An exemplary fitting 100a is attached to the flange 126m by fasteners 160 to further secure the stringer to the panel 112a. The fasteners may be preferably fastened at a distance 170 in the range of 0.09-0.11 inches from the beginning of a projection portion 135a of the fitting. The fitting may be preferably mounted at a distance 180 in the range of 0.09-0.11 inches from the second side wall 114m2.

In the example depicted in FIG. 5, first and second sidewalls 114*m*2 and 114*m*3 extend from cap section 114*m*1 and meet the panel to make acute angles at the join. In other examples, first and second sidewalls 114*m*2 and 114*m*3 can form obtuse angles or substantially right angles with panel. The angle between panel 112*a* and first sidewall 114*m*2 at the first join 114*j*1 may or may not be equal to the angle between panel 112*a* and second sidewall 114*m*3 at the second join 114*j*2. Further a composite adhesive material 114*c*1 and 114*c*2 extends along the first and second joins, respectively, between the first panel and the first stringer in adhesive attachment to the first panel and the first stringer. The composite adhesive material may have a plurality of composite layers to have a shape that substantially conforms to the space between the first panel and the stringer sidewalls at the first and second joins.

B. Illustrative Splice with a Stepped Edge

As shown in FIGS. 6A and 6B, this section describes an illustrative splice fitting 600. Splice fitting 600 is another example of a fitting that may be used to build a thermoplastic circumferential splice as described above. Splice fitting 600 is substantially similar to splice fitting 100*a*-*d*, described in Example A above. Accordingly, corresponding parts are correspondingly numbered. Those aspects of fitting 600 which differ from splice fitting 100*a*-*d* are described below.

A cross sectional view of the fitting 600 attached to a strap 120 and a stringer flange 126*b* mounted on to a first panel 112*a* is as shown in FIG. 6A. A first fitting surface 641 of a stringer base portion 632 is in contact with the stringer flange 126*b*. A second fitting surface 642 of a strap base portion 631 is opposite to the first panel region of the strap. A third fitting surface 643 of an intermediate base portion is facing the first panel region of the strap. Further the strap base portion 631 has a constant thickness and a fourth fitting surface 644 of the strap base portion 631 is opposite to the second fitting surface and is facing and spaced from the first panel region of the strap.

As mentioned with reference to strap 120 described above with reference to FIG. 2B, the first panel region 123*a* of the second strap surface 123 ends at a strap edge 123*a*2 that is distal of the first edge of the first panel. The strap edge 123*a*2 is spaced from the first strap surface 121. The strap includes the strap side face 123*f*1 that connects and is transverse to each of the first strap surface and the second strap surface.

As shown in FIG. 6A, the strap base portion has a first thickness T2 transverse to the fourth fitting surface. The intermediate base portion has a second thickness T3 transverse to the third fitting surface. In the present example, the first thickness T2 is less than the second thickness T3. The first thickness T2 is preferably at least one-tenth the second thickness T3.

The first fitting 600 includes a fitting end face 660, which connects the third fitting surface 643 to the fourth fitting surface 644. In other words, the fitting end face 660 represents a stepped fitting edge joining the third fitting surface to the fourth fitting surface, and the fitting end face 660 is facing the strap side face 123*f*1. In an example, the fitting end face 660 is spaced from the strap side face 123*f*1 by a gap G1. The gap G1 is preferably about 0.25 inches or less.

The above described stepped edge of the fitting 600 is inbuilt in the design of the fitting 600, which allows for manipulation of the fitting along the surfaces of the flange 126*b* and the first panel region of the strap to obtain mating of fitting surfaces with the flange and strap surfaces during installation. As shown in FIG. 6B, the gap G1 provides space to allow movement of fitting 600 toward the splice joint (to the right as shown in the figure) until the surface of the fourth fitting surface makes contact with the first panel region of the strap. The stepped edge feature specifically accounts for differences in thickness and orientation of the strap and the stringer flange in the fuselage structure splice and facilitates construction of an overall shimless splice joint.

C. Illustrative Method of Making a Fuselage Structure

Figure 7:
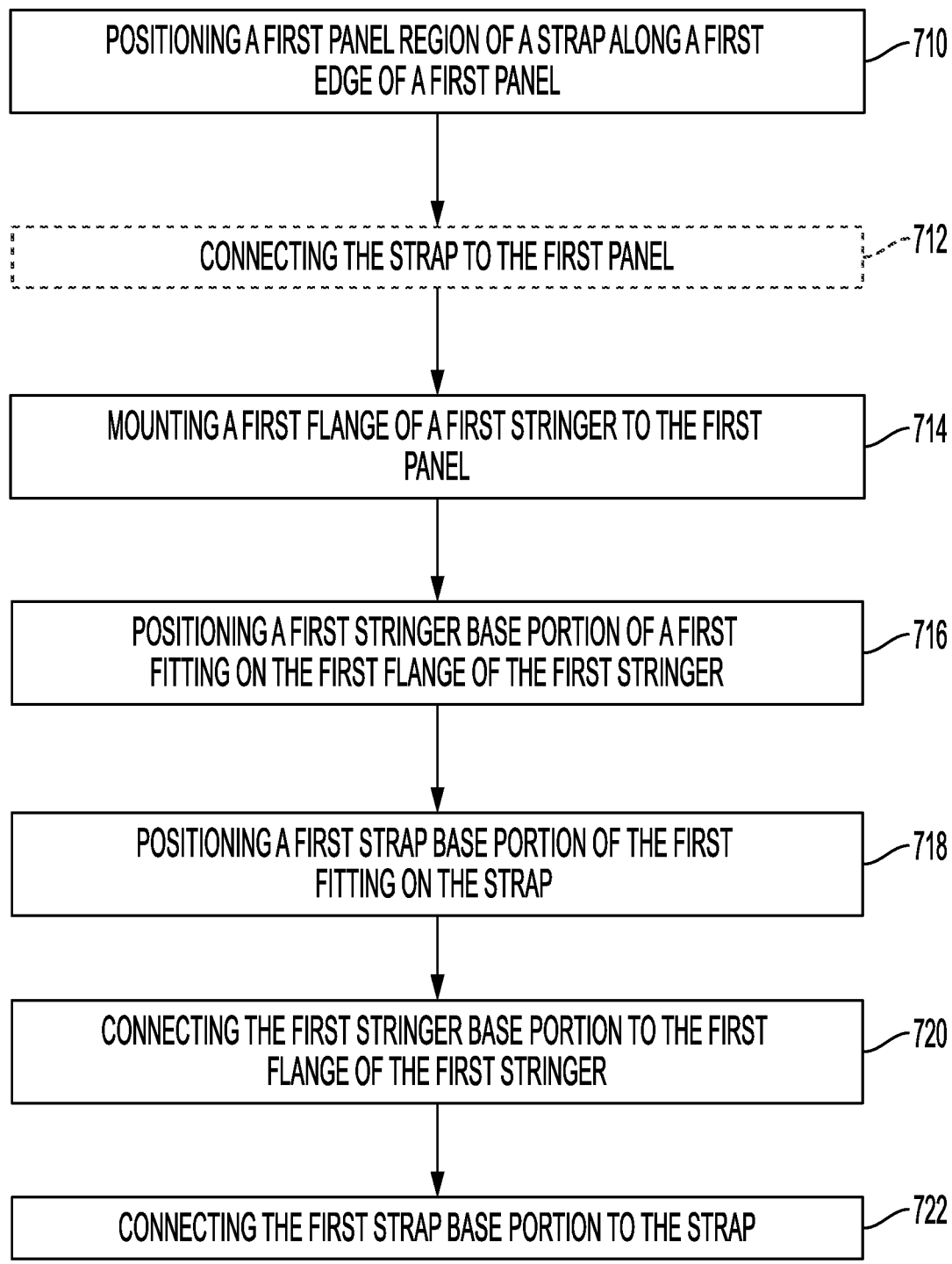
FIG. 7 is a flow chart depicting an example of steps of a method of assembling a splice joint according to the present teachings.

This section describes steps of an illustrative method 700 for making a fuselage structure; see FIG. 7. Aspects of splice fittings, stringers, straps, and/or any fuselage components previously described may be utilized in the method steps described below. Where appropriate, reference may be made to components and systems that may be used in carrying out each step. These references are for illustration, and are not intended to limit the possible ways of carrying out any particular step of the method.

FIG. 7 is a flowchart illustrating steps performed in an illustrative method, and may not recite the complete process or all steps of other processes including the illustrated method. Although various steps of method 700 are described below and depicted in FIG. 7, the steps need not necessarily all be performed, and in some cases may be performed simultaneously or in a different order than the order shown.

A step 710 includes positioning a first panel region 123*a* of a strap 120 along a first edge 113*a* of a first panel 112*a*. The strap has a strap first-surface 121 in contact with a first-panel major face 111*a*. First panel region 123*a* of a strap second-surface 123 tapers toward the first panel with distance from the first edge 113*a* of the first panel and extends away from the first edge of the first panel at a first angle relative to the strap first-surface. In some examples, step 710 further includes positioning a plurality of strap segments serially along the first edge of the first panel to form the strap.

An optional step 712 includes connecting the strap directly to the first panel before fittings are attached. The strap first-surface is in contact with the first panel major face and generally has a smooth, continuous surface to provide a continuous contact area for attachment. The strap may be connected to the first panel with a plurality of fasteners 160 extending through the strap and the first panel. In other examples, the strap may be bonded or bonded and fastened to the first panel.

A step 714 includes mounting a first flange 126*a* of a first stringer 114*a* to the first panel with the first stringer extending away from the first edge of the first panel. The first flange of the first stringer may be connected to the first panel with a plurality of fasteners 160 extending through the first flange and the first panel. In some examples, step 714 further includes adhesively attaching the first stringer to the first panel by applying a composite adhesive material. The adhesive material may extend along a join between the first panel and the first stringer, as shown in FIG. 5.

A step 716 includes positioning the first stringer base portion 132*b* of a first fitting 100*b* on the first flange 126*a* of the first stringer 114*a*. The first stringer base portion may extend along a first line 146 extending in a first plane P1 normal to the first edge of the first panel, as shown in FIG. 4. The first stringer base portion may have a thickness along the first flange, which tapers with distance from the strap. The first stringer base portion may have a first fitting surface 141*b* that is in contact with the first flange. The first fitting surface may extend parallel to the first line.

Step 718 includes positioning the strap base portion 131*b* of the fitting 100*b* on the strap. The first strap base portion may extend along a second line 147 extending in the first plane P1. The second line may be transverse to the first line at the first angle B1. In an example, the first strap base portion may have a constant thickness along the second line. The first strap base portion may have a second fitting surface 142*b* that is opposite the strap. The second fitting surface may extend along the strap parallel to the second line. The first strap base portion may have a third fitting surface 144*b* that is facing the strap. In some examples step 718, further includes moving the first fitting towards or away from the strap so as to obtain a continuous contact between the third fitting surface of the strap base portion and the strap. This feature provides for a reduced need of shims or fillers during the method for making the fuselage structure by placing the surface of the strap base portion of the first fitting in continuous contact with the strap second surface.

A step 720 includes connecting the first stringer base portion 132*b* of the first fitting 100*b* to the first flange 126*b* of the first stringer 114*a*. The first stringer base portion may be connected to the first flange by any effective method, including but not limited to fasteners 160 extending through the first stringer base portion and the first flange.

A step 722 includes connecting the first strap base portion 131*b* to the strap 120. The first strap base portion may be connected to the strap by any effective method, including but not limited to fasteners 160 extending through the first strap base portion and the strap. In some examples, step 722 may include connecting the first strap base portion to the panel through the strap, which also may connect the strap to the panel.

D. Illustrative Method of Using the Splice with a Stepped Edge

Figure 8:
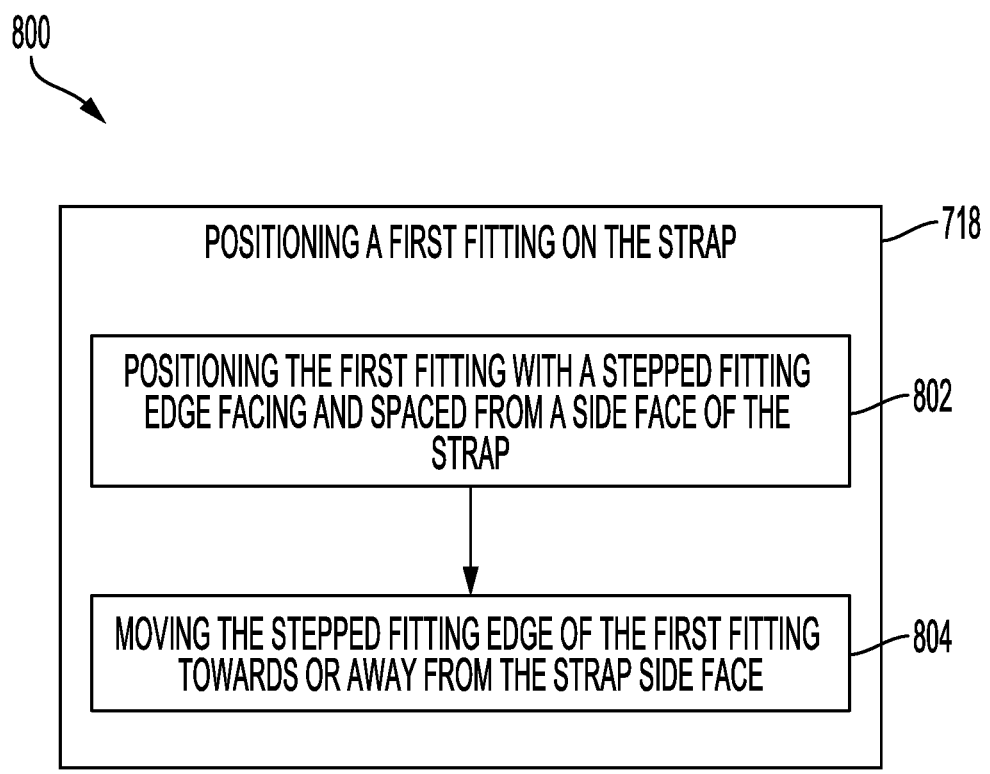
FIG. 8 is a flow chart depicting another example of steps of a method of positioning a fitting on a strap of a splice joint according to the present teachings.

This section describes steps of an illustrative method 800 for positioning the fitting relative to the strap; see FIG. 8. Aspects of splice fitting, stringers, straps, and/or any fuselage components previously described may be utilized in the method steps described below. Where appropriate, reference may be made to components and systems that may be used in carrying out each step. These references are for illustration, and are not intended to limit the possible ways of carrying out any particular step of the method.

FIG. 8 is a flowchart illustrating steps performed in an illustrative method, and may not recite the complete process or all steps of the method. Although various steps of method 800 are described below and depicted in FIG. 8, the steps need not necessarily all be performed, and in some cases may be performed simultaneously or in a different order than the order shown.

Method 800 may be an example of steps that may be performed in step 718 of method 700. A step 802 includes positioning the first fitting 600 relative to the strap 120. The first fitting has the first stringer base portion 632, the first strap base portion 631, as well as a stepped fitting edge 660, as is shown in FIGS. 6A and 6B. The first fitting surface 641 may be joined to the third fitting surface 644 by the stepped fitting edge. In this example, the strap first surface 121 is connected to the strap second surface 123*a* by a strap side face 123*f*1. The first fitting is positioned relative to the strap with the stepped fitting edge facing the strap side face.

A step 804 includes moving the fitting along the stringer flange so the stepped fitting edge of the fitting moves towards or away from the strap side face. The fitting is moved appropriately to place the surface of the strap base portion of the fitting in continuous contact with the strap second surface. This manipulation of the fitting provides for a reduced need of shims or fillers during the method for making the fuselage structure because the surface of the strap base portion is in continuous contact with the strap second surface.

Illustrative Combinations and Additional Examples

This section describes additional aspects and features of a fuselage structure splice, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A fuselage structure splice comprising:

a first panel having a first-panel major face and a first edge;

a strap connected to the first panel, wherein the strap extends along the first edge of the first panel and has a first strap surface in contact with the first-panel major face and a second strap surface tapering toward the first panel with distance from the first edge of the first panel;

a first stringer mounted on the first-panel major face, extending away from the first edge of the first panel, and having a first flange mounted to the first-panel major face; and a first fitting having a first stringer base portion and a first strap base portion, wherein the first stringer base portion is connected to the first flange of the first stringer and extends along a first line extending in a first plane normal to the first edge of the first panel, the first strap base portion is mounted on the second strap surface and extends along a second line in the first plane, the second line is transverse to the first line, and the first strap base portion has a constant thickness along the second line.

A1. The fuselage structure splice of paragraph A0, wherein the first stringer base portion has a first fitting surface that is in contact with the first flange and extends parallel to the first line, the first strap base portion has a second fitting surface that is opposite the strap, and the second fitting surface extends along the strap in the first plane parallel to the second line.

A2. The fuselage structure splice of paragraph A0, wherein the first stringer base portion has a thickness along the first flange which tapers with distance from the strap.

A3. The fuselage structure splice of paragraph A0, wherein the first fitting further includes a first stringer projection portion and a first strap projection portion, the first stringer projection portion extends transversely from the first stringer base portion, the first strap projection portion extends transversely from the first strap base portion, the first stringer projection portion has a first distal edge that is distal of the first stringer base portion and extends along a first edge line that is parallel to the first line, the first strap projection portion has a second distal edge that is distal of the first strap base portion and extends along a second edge line that is parallel to the second line, and the first distal edge extends transverse to the second distal edge.

A4. The fuselage structure splice of paragraph A3, wherein the first fitting includes a radiused first joint joining the first stringer base portion to the first stringer projection portion and, a radiused second joint joining the first strap base portion to the first strap projection portion.

A5. The fuselage structure splice of paragraph A0, wherein the first stringer includes a second flange spaced apart from the first flange and mounted to the first-panel major face, and a raised portion between the first and second flanges extending away from the first panel beyond the first and second flanges; and the fuselage structure splice further comprises a second fitting having a second stringer base portion and a second strap base portion, wherein the second stringer base portion is connected to the second flange of the first stringer and extends along a third line extending in a second plane normal to the first edge of the first panel, the second strap base portion is mounted on the second strap surface and extends along a fourth line in the second plane, the fourth line is transverse to the third line, and the second strap base portion has a constant thickness along the fourth line.

A6. The fuselage structure splice of paragraph A5, wherein the second stringer base portion has a third fitting surface that is in contact with the second flange and extends parallel to the third line, the second strap base portion has a fourth fitting surface that is opposite the strap, and the fourth fitting surface extends along the strap in the second plane parallel to the fourth line.

A7. The fuselage structure splice of paragraph A5, wherein the first and second fittings are arranged in a mirror image relationship relative to a third plane parallel to and disposed between the first and second planes.

A8. The fuselage structure splice of paragraph A0, further comprising:

a second panel having a second-panel major face and a second edge, wherein the second edge is positioned in edgewise alignment with the first edge of the first panel to form a splice joint with the first-panel major face in alignment with the second-panel major face with the first strap surface of the strap in contact with the second-panel major face;

a second stringer mounted on the second-panel major face, extending away from the splice joint and having a second flange mounted to the second panel major face; and a second fitting having a second stringer base portion and a second strap base portion, wherein the second stringer base portion is connected to the second flange of the second stringer and extends along a third line extending in a second plane normal to the second edge of the second panel, the second strap base portion is mounted on the second strap surface and extends along a fourth line in the second plane, the fourth line is transverse to the third line, and the second strap base portion has a constant thickness along the fourth line.

A9. The fuselage structure splice of paragraph A8, wherein the second stringer base portion has a third fitting surface that is in contact with the second flange and extends parallel to the third line, the second strap base portion has a fourth fitting surface that is opposite the strap, and the fourth fitting surface extends along the strap in the second plane parallel to the fourth line.

A10. The fuselage structure splice of paragraph A0, wherein the first fitting includes an intermediate base portion connecting the first stringer base portion to the first strap base portion, the intermediate base portion has a third fitting surface facing the first panel, the third fitting surface extends along a third line extending in the first plane, and the third line is transverse to the first line and the second line.

A11. The fuselage structure splice of paragraph A10, wherein the second line forms a first acute angle with the first line, the third line forms a second acute angle with the first line, and the first acute angle is less than the second acute angle.

A12. The fuselage structure splice of paragraph A0, wherein the first stringer base portion has a greater thickness transverse to the first fitting surface than the thickness of the first strap base portion transverse to the second fitting surface.

A13. The fuselage structure splice of paragraph A12, wherein the first strap base portion includes a third fitting surface opposite to the second fitting surface facing the second strap surface and extending along a third line in the first plane wherein the third line is parallel to the second line.

A14. The fuselage structure splice of paragraph A12, wherein a first panel region of the second strap surface ends at a strap edge that is distal of the first edge of the first panel, the strap edge is spaced from the first strap surface, the strap includes a strap side face that connects the first strap surface to the second strap surface, the first fitting further includes a stepped fitting edge joining the first fitting surface to the third fitting surface, and the stepped fitting edge faces the strap side face.

A15. The fuselage structure splice of paragraph A14, wherein the stepped fitting edge is spaced from the strap side face by a gap.

A16. The fuselage structure splice of paragraph A0, wherein the first fitting further includes a first stringer projection portion that extends transversely from the first stringer base portion, the first stringer includes a second flange spaced apart from the first flange and mounted to the first panel and a raised stringer portion between the first and second flanges extending away from the first panel beyond the first and second flanges, and the first stringer projection portion is positioned proximate to the raised stringer portion.

A17. The fuselage structure splice of paragraph A0, wherein the first stringer includes a second flange spaced apart from the first flange and mounted to the first panel and a raised stringer portion between the first and second flanges extending away from the first panel beyond the first and second flanges, and the fuselage structure splice further comprises a composite adhesive material extending along a join between the first panel and the first stringer in adhesive attachment to the first panel and the first stringer.

A18. The fuselage structure splice of paragraph A0, wherein the strap is comprised of multiple strap segments positioned serially along the first edge of the first panel.

B0. A fitting for a fuselage structure splice, where the fuselage structure splice includes a first panel having a first-panel major face and a first edge; a strap connected to the first panel, wherein the strap extends along the first edge of the first panel and has a first strap surface in contact with the first-panel major face and a second strap surface tapering toward the first panel with distance from the first edge of the first panel; and a stringer mounted on the first-panel major face, extending away from the first edge of the first panel, and having a first flange mounted to the first-panel major face; wherein the fitting comprises an elongate base having a stringer base portion and a strap base portion, wherein the stringer base portion is configured to be connected to the first flange of the stringer, and extends along a first line extending in a first plane normal to the first edge of the first panel, the strap base portion is configured to be mounted on the second strap surface and extends along a second line in the first plane, the second line is transverse to the first line, and the strap base portion has a constant thickness along the second line.

B1. The fuselage structure splice of paragraph B0, wherein the stringer base portion has a first fitting surface that is configured to be in contact with the first flange and extends parallel to the first line, the strap base portion has a second fitting surface that extends along and is opposite the strap, and the second fitting surface extends along the strap in the first plane parallel to the second line.

B2. The fitting of paragraph B0, wherein the stringer base portion has a thickness along the first line that tapers with distance from the strap base portion.

B3. The fitting of paragraph B0, further comprising a stringer projection portion and a strap projection portion, wherein the stringer projection portion extends transversely from the stringer base portion, the strap projection portion extends transversely from the strap base portion, the stringer projection portion has a first distal edge that is distal of the stringer base portion and extends along a first edge line that is parallel to the first line, the strap projection portion has a second distal edge that is distal of the strap base portion and extends along a second edge line that is parallel to the second line, and the first distal edge extends transverse to the second distal edge.

B4. The fitting of paragraph B3, further comprising a radiused first joint joining the stringer base portion to the stringer projection portion and, a radiused second joint joining the strap base portion to the strap projection portion.

B5. The fitting of paragraph B0, further comprising an intermediate base portion connecting the stringer base portion to the strap base portion, the intermediate base portion has a fitting third surface facing the first panel, the fitting third surface extends along a third line extending in the first plane, and the third line is transverse to the first line and the second line.

B6. The fitting of paragraph B5, wherein the second line forms a first acute angle with the first line, the third line forms a second acute angle with the first line, and the first acute angle is less than the second acute angle.

B7. The fitting of paragraph B0, wherein the stringer base portion has a greater thickness in the first plane than the thickness of the strap base portion in the first plane.

B8 The fuselage structure splice of paragraph B7, wherein the strap base portion includes a third fitting surface opposite to the second fitting surface facing the second strap surface and extending along a third line in the first plane wherein the third line is parallel to the second line.

B9. The fitting of paragraph B8, further a stepped fitting edge joining the first fitting surface to the third fitting surface and facing away from the stringer base portion.

B10. The fitting of paragraph B0, where the stringer includes a raised stringer portion extending from the first flange away from the first panel, and the fitting further comprises a stringer projection portion that extends transversely from the stringer base portion and the fitting is configured to be mounted on the flange with the stringer projection portion positioned proximate to the raised stringer portion.

C0. A method of making a fuselage structure comprising the steps of:

positioning a first panel region of a strap along a first edge of a first panel, the strap having a strap first-surface in contact with a first-panel major face and a strap second-surface tapering toward the first panel with distance from the first edge of the first panel and extending away from the first edge of the first panel at a first angle relative to the strap first-surface;

mounting a first flange of a first stringer to the first panel with the first stringer extending away from the first edge of the first panel;

positioning a first stringer base portion of a first fitting on the first flange of the first stringer with the first stringer base portion extending along a first line extending in a first plane normal to the first edge of the first panel;

positioning a first strap base portion of the first fitting on the strap with the first strap base portion extending along a second line extending in the first plane, the second line being transverse to the first line at the first angle, with the first strap base portion having a constant thickness along the second line;

connecting the first stringer base portion to the first flange of the first stringer; and connecting the first strap base portion to the strap.

C1. The method of paragraph C0, wherein the first stringer base portion has a first fitting surface that is in contact with the first flange and extends parallel to the first line, the first strap base portion has a second fitting surface that is opposite the strap, and the second fitting surface extends along the strap parallel to the second line.

C2. The fuselage structure splice of paragraph C1, wherein the first strap base portion includes a third fitting surface opposite to the second fitting surface facing the second strap surface and extending along a third line in the first plane wherein the third line is parallel to the second line.

C3. The method of paragraph C0, further comprising:

mounting a second flange of the first stringer to the first panel with the second flange spaced apart from the first flange, and a raised stringer portion extending between the first and second flanges and extending away from the first panel beyond the first and second flanges;

positioning a second stringer base portion of a second fitting on to the second flange of the first stringer with the second stringer base portion extending along a third line extending in a second plane normal to the first edge of the first panel, positioning a second strap base portion of the second fitting on to the strap with the second strap base portion extending along a fourth line extending in the second plane, the fourth line being transverse to the third line at the first angle, with the second strap base portion having a constant thickness along the fourth line;

connecting the second stringer base portion to the second flange of the first stringer; and connecting the second strap base portion to the strap.

C4. The method of paragraph C3, wherein the second stringer base portion has a third fitting surface that is in contact with the second flange and extends parallel to the third line, the first strap base portion has a fourth fitting surface that is opposite the strap, and the fourth fitting surface extends along the strap in the second plane parallel to the fourth line.

C5. The method of paragraph C3, wherein positioning the second fitting includes positioning the second fitting relative to the first fitting in a mirror image relationship relative to a third plane parallel to and disposed between the first and second planes.

C6. The method of paragraph C0, further comprising:

positioning a second edge of a second panel having a second-panel major face, in edgewise alignment with the first edge of the first panel having the first-panel major face to form a splice joint, with the first-panel major face in alignment with the second-panel major face;

positioning a second panel region of the strap along the second edge of the second panel, the strap extending along the second edge of the second panel and having the strap first-surface in contact with the second-panel major face and the strap second-surface tapering toward the second panel with distance from the second edge of the second panel and extending away from the second edge of the second panel at the first angle relative to the strap first-surface;

mounting a second flange of a second stringer to the second panel with the second stringer extending away from the splice joint;

positioning a second stringer base portion of a second fitting on the second flange of the second stringer with the second stringer base portion extending along a third line extending in a second plane normal to the second edge of the second panel;

positioning a second strap base portion of the second fitting on the strap with the second strap base portion extending along a fourth line extending in the second plane, the fourth line being transverse to the third line at the first angle, with the second strap base portion having a constant thickness along the fourth line;

connecting the second stringer base portion to the second flange of the second stringer; and connecting the second strap base portion to the strap.

C7. The method of paragraph C6, wherein the second stringer base portion has a third fitting surface that is in contact with the second flange and extends parallel to the third line, the first strap base portion has a fourth fitting surface that is opposite the strap, and the fourth fitting surface extends along the strap in the second plane parallel to the fourth line.

C8. The method of paragraph C2, wherein the first fitting surface is joined to the third fitting surface by a stepped fitting edge, and positioning the first fitting includes positioning the first fitting with the stepped fitting edge facing a strap side face connecting the strap first surface to the strap second surface.

C9. The method of paragraph C8, wherein positioning the first fitting with the stepped fitting edge facing the strap side face includes positioning the first fitting with the stepped fitting edge spaced from the strap side face by a gap.

C10. The method of paragraph C0, wherein the first fitting further includes a first stringer projection portion that extends transversely from the first stringer base portion, the first stringer includes a second flange spaced apart from the first flange and mounted to the first panel and a raised stringer portion between the first and second flanges extending away from the first panel beyond the first and second flanges, and the method further comprises positioning the first stringer projection portion proximate to the raised stringer portion.

C11. The method of paragraph C0, wherein the first stringer includes a second flange spaced apart from the first flange and a raised stringer portion between the first and second flanges extending away from the first panel beyond the first and second flanges, and the method further comprises mounting the second flange of the first stringer to the first panel, and adhesively attaching the first panel to the first stringer by applying a composite adhesive material extending along a join between the first panel and the first stringer.

C12. The method of paragraph C0, wherein positioning a strap includes positioning a plurality of strap segments serially along the first edge of the first panel.

Advantages, Features, and Benefits

The different examples of the fittings described herein provide several advantages over known solutions for making a fuselage structure splice. For example, illustrative examples described herein allow for an individual fitting to connect two different components, and typically does not need to be limited to a specific dimension and/or geometric shape of the components. Furthermore, illustrative embodiments and examples described herein allow for manipulation of the individual fittings to obtain mating of fitting surfaces with the component surfaces before fastening.

Additionally, and among other benefits, illustrative examples described herein may reduce or eliminate the need for shims and fillers during the making of the fuselage structure; may facilitate uniform and standardized joining of multiple fuselage sections; and may provide load transfer continuity across a fuselage structure splice.

No known system or device can perform these functions, particularly with a fitting configuration designed to conform the fitting surfaces to the component surfaces to which it is connected. Thus, the illustrative examples described herein are particularly useful for a fuselage structure splice. However, not all examples described herein provide the same advantage or the same degree of advantage.

Conclusion

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A fuselage structure splice comprising:
a first panel having a first-panel major face and a first edge;
a strap connected to the first panel, wherein the strap extends along the first edge of the first panel and has a first strap surface in contact with the first-panel major face and a second strap surface tapering toward the first panel with distance from the first edge of the first panel;
a first stringer mounted on the first-panel major face, extending away from the first edge of the first panel, and having a first flange mounted to the first-panel major face; and
a first fitting having a first stringer base portion, a first intermediate base portion, and a first strap base portion, wherein the first stringer base portion is connected to the first flange of the first stringer and extends along a first line extending in a first plane normal to the first edge of the first panel, the first strap base portion is mounted on the second strap surface and extends along a second line in the first plane, the second line is transverse to the first line, and the first strap base portion has a constant thickness along the second line, wherein the first stringer base portion of the first fitting has a first fitting surface that is in contact with the first flange of the first stringer, the first strap base portion of the first fitting has a second fitting surface that is in contact with the strap, the first intermediate base portion of the first fitting has a third fitting surface facing the first panel, and a stepped fitting edge connecting the second fitting surface to the third fitting surface.

2. The fuselage structure splice of claim 1, wherein the first fitting surface that is in contact with the first flange extends parallel to the first line, the first strap base portion has a fourth fitting surface that is opposite the strap, and the fourth fitting surface extends along the strap in the first plane parallel to the second line.

3. The fuselage structure splice of claim 1, wherein the first stringer includes a second flange spaced apart from the first flange and mounted to the first-panel major face, and a raised portion between the first and second flanges extending away from the first panel beyond the first and second flanges; and the fuselage structure splice further comprises
a second fitting having a second stringer base portion and a second strap base portion, wherein the second stringer base portion is connected to the second flange of the first stringer and extends along a third line extending in a second plane normal to the first edge of the first panel, the second strap base portion is mounted on the second strap surface and extends along a fourth line in the second plane, the fourth line is transverse to the third line, and the second strap base portion has a constant thickness along the fourth line.

4. The fuselage structure splice of claim 1, further comprising:
a second panel having a second-panel major face and a second edge, wherein the second edge is positioned in edgewise alignment with the first edge of the first panel to form a splice joint with the first-panel major face in alignment with the second-panel major face with the first strap surface of the strap in contact with the second-panel major face;
a second stringer mounted on the second-panel major face, extending away from the splice joint and having a second flange mounted to the second-panel major face; and
a second fitting having a second stringer base portion and a second strap base portion, wherein the second stringer base portion is connected to the second flange of the second stringer and extends along a third line extending in a second plane normal to the second edge of the second panel, the second strap base portion is mounted on the second strap surface and extends along a fourth line in the second plane, the fourth line is transverse to the third line, and the second strap base portion has a constant thickness along the fourth line.

5. The fuselage structure splice of claim 1, the third fitting surface extends along a third line extending in the first plane, and the third line is transverse to the first line and the second line.

6. The fuselage structure splice of claim 1, wherein the first fitting further includes a first stringer projection portion that extends transversely from the first stringer base portion, the first stringer includes a second flange spaced apart from the first flange and mounted to the first panel and a raised stringer portion between the first and second flanges extending away from the first panel beyond the first and second flanges, and the first stringer projection portion is positioned proximate to the raised stringer portion.

7. The fuselage structure splice of claim 1, wherein the first stringer includes a second flange spaced apart from the first flange and mounted to the first panel and a raised stringer portion between the first and second flanges extending away from the first panel beyond the first and second flanges, and the fuselage structure splice further comprises a composite adhesive material extending along a join between the first panel and the first stringer in adhesive attachment to the first panel and the first stringer.

8. The fuselage structure splice of claim 1, wherein the first stringer base portion has a thickness along the first line that tapers with distance from the first strap base portion.

9. The fuselage structure splice of claim 1, wherein a first panel region of the second strap surface ends at a strap edge that is distal of the first edge of the first panel, the strap edge is spaced from the first strap surface, the strap includes a strap side face that connects the first strap surface to the second strap surface.

10. The fuselage structure splice of claim 9, wherein the stepped fitting edge faces the strap side face.

11. The fuselage structure splice of claim 9, wherein the stepped fitting edge is spaced from the strap side face by a gap.

12. The fuselage structure splice of claim 9; wherein the stepped fitting edge of the fitting engages the strap side face of the strap.

13. The fuselage structure splice of claim 1, wherein the first stringer base portion of the first fitting has a greater thickness than a thickness of the first strap base portion of the first fitting.

14. The fuselage structure splice of claim 1, wherein the first strap base portion of the first fitting has a first thickness, and the first intermediate base portion of the first fitting has a second thickness, and the first thickness is less than the second thickness.

15. A method of making a fuselage structure comprising the steps of:
positioning a panel region of a strap along an edge of a panel, the strap having a strap first surface in contact with a panel major face and a strap second surface tapering toward the panel with distance from the edge of the panel and extending away from the edge of the panel at an angle relative to the strap first surface;
mounting a first flange of a stringer to the panel with the stringer extending away from the edge of the panel;
positioning a first stringer base portion of a first fitting on the first flange of the stringer with the first stringer base portion extending along a first line extending in a first plane normal to the edge of the panel;
positioning a first strap base portion of the first fitting on the strap with the first strap base portion extending along a second line extending in the first plane, the second line being transverse to the first line at the angle, with the first strap base portion having a constant thickness along the second line;
connecting the first stringer base portion to the first flange of the stringer; and
connecting the first strap base portion to the strap,
wherein the first stringer base portion of the first fitting has a first fitting surface that is in contact with the first flange of the first stringer, the first strap base portion of the first fitting has a second fitting surface that is in contact with the strap, a first intermediate base portion of the first fitting has a third fitting surface facing the panel, and a stepped fitting edge connecting the second fitting surface to the third fitting surface.

16. The method of claim 15, further comprising:
mounting a second flange of the stringer to the panel with the second flange spaced apart from the first flange, and a raised stringer portion extending between the first and second flanges and extending away from the panel beyond the first and second flanges;
positioning a second stringer base portion of a second fitting onto the second flange of the stringer with the second stringer base portion extending along a third line extending in a second plane normal to the edge of the panel, positioning a second strap base portion of the second fitting onto the strap with the second strap base portion extending along a fourth line extending in the second plane, the fourth line being transverse to the third line at the angle, with the second strap base portion having a constant thickness along the fourth line;

connecting the second stringer base portion to the second flange of the stringer; and connecting the second strap base portion to the strap.

17. The method of claim 16, wherein positioning the second fitting includes positioning the second fitting relative to the first fitting in a mirror image relationship relative to a third plane disposed between the first and second planes.

18. The method of claim 15, wherein positioning the first fitting includes positioning the first fitting with the stepped fitting edge facing a strap side face connecting the strap first surface to the strap second surface.

19. The method of claim 15, wherein the first fitting further includes a first stringer projection portion that extends transversely from the first stringer base portion, the stringer includes a second flange spaced apart from the first flange and mounted to the panel and a raised stringer portion between the first and second flanges extending away from the panel beyond the first and second flanges, and the method further comprises positioning the first stringer projection portion proximate to the raised stringer portion.

20. The method of claim 15, wherein the stringer includes a second flange spaced apart from the first flange and a raised stringer portion between the first and second flanges extending away from the panel beyond the first and second flanges, and the method further comprises mounting the second flange of the stringer to the panel, and adhesively attaching the panel to the stringer by applying a composite adhesive material extending along a join between the panel and the stringer.

* * * * *